United States Patent [19]

Muraguchi

[11] Patent Number: 5,432,874
[45] Date of Patent: Jul. 11, 1995

[54] DUPLEX OPTICAL FIBER LINK

[75] Inventor: Takahiro Muraguchi, Tokyo, Japan

[73] Assignee: Sony Corporation, Tokyo, Japan

[21] Appl. No.: 197,120

[22] Filed: Feb. 16, 1994

[30] Foreign Application Priority Data

Feb. 17, 1993 [JP] Japan .................. 5-028148

[51] Int. Cl.⁶ .................................................. G02B 6/28
[52] U.S. Cl. ............................... 385/24; 385/27; 385/31; 250/551; 359/115; 359/152
[58] Field of Search .................. 385/24, 27, 31; 250/551; 359/117, 115, 118, 121, 124, 125, 152, 173

[56] References Cited

U.S. PATENT DOCUMENTS

| | | | |
|---|---|---|---|
| 5,005,936 | 4/1991 | Hsu | 385/24 |
| 5,069,521 | 12/1991 | Hardwick | 385/24 |
| 5,224,183 | 6/1993 | Dugan | 385/24 |
| 5,315,426 | 5/1994 | Aoki | 359/173 |
| 5,317,440 | 5/1994 | Hsu | 359/152 |
| 5,343,315 | 8/1994 | Auffret et al. | 359/173 |

Primary Examiner—Rodney B. Bovernick
Assistant Examiner—Phan T. H. Palmer
Attorney, Agent, or Firm—Limbach & Limbach; Philip M. Shaw, Jr.

[57] ABSTRACT

A light signal transmitting apparatus having first and second light signal terminals and two optical fibers for coupling the first and second light signal terminals to transmit light signals in the opposite directions. The first light signal terminal comprises a separating device for separating a multiplexed light signal in which first and second light signals are multiplexed, first and second light-sensing devices for receiving the first and second light signals thus separated, a detecting circuit for generating a detection signal on the basis of a received output of the second light-sensing device, and a first light emitting device controlled by the detecting circuit so that the first light emitting device emits a third light signal of sufficiently high output level when the second light signal is detected by the detecting circuit and that the first light emitting device emits a third light signal of low output level or disabled when the second light signal is not detected by the detecting circuit. The second light signal terminal comprises a third light-sensing device for receiving the third light signal, second and third light emitting devices for emitting the first and second light signals, and a multiplexer for multiplexing the first and second light signals to provide the multiplexed signal.

9 Claims, 3 Drawing Sheets

DUPLEX OPTICAL FIBER LINK

BACKGROUND OF THE INVENTION

Field of the Invention

The present invention relates to a light signal transmitting apparatus having first and second light signal terminals and two optical fibers for coupling the first and second light signal terminals to transmit light signals in the opposite directions.

Description of the Prior Art

An example of this type of conventional light signal transmitting apparatus will be described below with reference to FIG. 1 of the accompanying drawings.

As shown in FIG. 1, there are provided links 31, 32 which serve as first and second light signal terminals. The two links 31, 32 are coupled with each other by two optical fibers 33, 34 through which light signals are transmitted in the opposite directions. The link 31 includes a laser diode 35 serving as an electro-optic converter and a photo-diode 36 serving as an opto-electro converter. The link 32 includes a laser diode 38 serving as an electro-optic converter and a photo-diode 37 serving as an opto-electro converter.

In the link 31, an electrical signal is supplied to the laser diode 35, in which it is converted into a laser light signal. This laser light signal is transmitted through the optical fiber 33 and received by the photo-diode 37 in the link 32, in which it is converted into an electrical signal. In the link 32, an electrical signal is supplied to the laser diode 38, in which it is converted into a laser light signal. This laser light signal is transmitted through the optical fiber 34 and received by the photo-diode 36 in the link 31, thereby being converted into an electrical signal.

When the conventional light signal transmitting apparatus uses a non-laser light emitting device, such as an LED (light emitting diode) or the like, a light emitted from such non-laser light emitting device cannot be modulated by a high speed electrical signal. Therefore, when the electrical signal is the high speed electrical signal, the laser light emitting device, such as the laser diode or the like, must be used. In the light signal transmitting apparatus, if an optical fiber through which a laser light is transmitted is disengaged from optical equipments or broken down, there is then the risk that a laser light is leaked to the outside to damage human eyes or the like.

If an intensity of the laser light transmitted through the optical fiber is set to be relatively low, even when the laser light is leaked to the outside, there is then no risk that the laser light thus leaked will hurt human eyes or the like. With the above arrangement, however, a transmission quality of the laser light is degraded with the result that the transmission distance of the laser light is reduced.

OBJECTS AND SUMMARY OF THE INVENTION

It is therefore an object of the present invention to provide an improved light signal transmitting apparatus in which the aforesaid shortcomings and disadvantages encountered with the prior art can be eliminated.

More specifically, it is an object of the present invention to provide a light signal transmitting apparatus having a pair of light signal terminals and two optical fibers for coupling the above two light signal terminals to transmit light signals in the opposite directions in which a light signal of sufficiently high output can be transmitted.

It is another object of the present invention to provide a light signal transmitting apparatus in which even when optical fiber is disengaged from optical equipments or broken down, a light signal transmitted through the optical fiber can be prevented from being leaked to the outside to hurt human eyes or the like.

According to a first aspect of the present invention, there is provided a light signal transmitting apparatus having first and second light signal terminals and two optical fibers for coupling the first and second light signal terminals to transmit light signals in the opposite directions. The first light signal terminal is comprised of a separating device for separating a multiplexed light signal in which first and second light signals are multiplexed, first and second light-sensing devices for receiving the first and second light signals thus separated, a detecting circuit for generating a detection signal on the basis of a received output of the second light-sensing device, and first light emitting device controlled by the detecting circuit so that the first light emitting device emits a third light signal of sufficiently high output level when the second light signal is detected by the detecting circuit and that the first light emitting device emits a third light signal of low output level or disabled when the second light signal is not detected by the detecting circuit. The second light signal terminal is comprised of third light-sensing device for receiving the third light signal, second and third light emitting devices for emitting the first and second light signals, and a multiplexer for multiplexing the first and second light signals to provide the multiplexed signal.

According to a second aspect of the present invention, there is provided a light signal transmitting apparatus having first and second light signal terminals and two optical fibers for coupling the first and second light signal terminals to transmit light signals in the opposite directions. The first light signal terminal is comprised of a first separating device for separating a first multiplexed signal in which first and second light signals are multiplexed to provide first and second light signals, first and second light-sensing devices for receiving the first and second light signals thus separated, a first detecting circuit for generating a first detection signal on the basis of a received output of the second light-sensing device, a first light emitting device controlled by the first detecting circuit so that the first light emitting device emits a third light signal of sufficiently high output level when the second light signal is detected by the first detecting circuit and that the first light emitting device emits a third light signal of low output level or disabled when the second light signal is not detected by the first detecting circuit, a second light emitting device for emitting a fourth light signal regardless of whether or not the second light signal is detected by the first detecting circuit, and a first multiplexer for multiplexing the third and fourth light signals from the first and second light emitting devices. The second light signal terminal is comprised of a second separating means for separating the second multiplexed light signal to provide the third and fourth light signals, third and fourth light-sensing devices for receiving the third and fourth light signals thus separated, a second detecting circuit for generating a second detection signal on the basis of a received output of the fourth light-sensing device, a third light emitting device controlled by the second detecting circuit so that the third light emitting device emits the first light signal of sufficiently high output level when the fourth light signal is detected by the second detecting circuit and that the third light emitting device emits the first light signal of low output level or disabled when the fourth light signal is not detected by the second detecting circuit, a fourth light emitting device for emitting the second light signal regardless of whether or not the fourth light signal is detected by the second detecting circuit, and a second multiplexer for multiplexing the first and second light signals from the third and fourth light emitting devices to provide the first multiplexed signal.

According to a third aspect of the present invention, there is provided a light signal terminal for transmitting and receiving a light signal which is comprised of a first light emitting device for emitting a first light signal, a second light emitting device for emitting a second light signal, a multiplexer for multiplexing the first and second light signals to generate a transmission multiplexed signal, a separating device for separating a received multiplexed signal to generate third and fourth light signals, a first light-sensing device for receiving the third light signal, a second light-sensing device for receiving the fourth light signal, and a control circuit for controlling an output signal of the first light signal on the basis of a received output of the second light-sensing device.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

An embodiment (duplex optical fiber link) of the present invention will hereinafter be described in detail with reference to FIG. 2.

Figure 1:
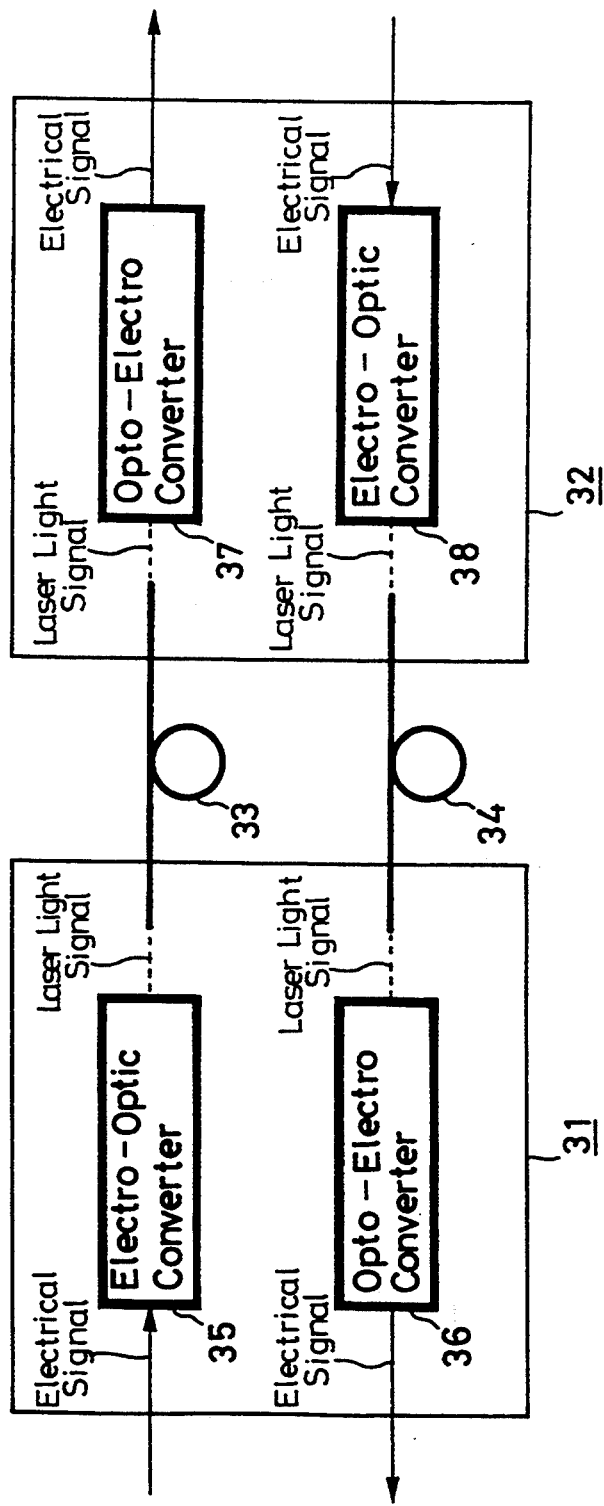
FIG. 1 is a block diagram showing an example of a conventional light signal transmitting apparatus.
Figure 2:
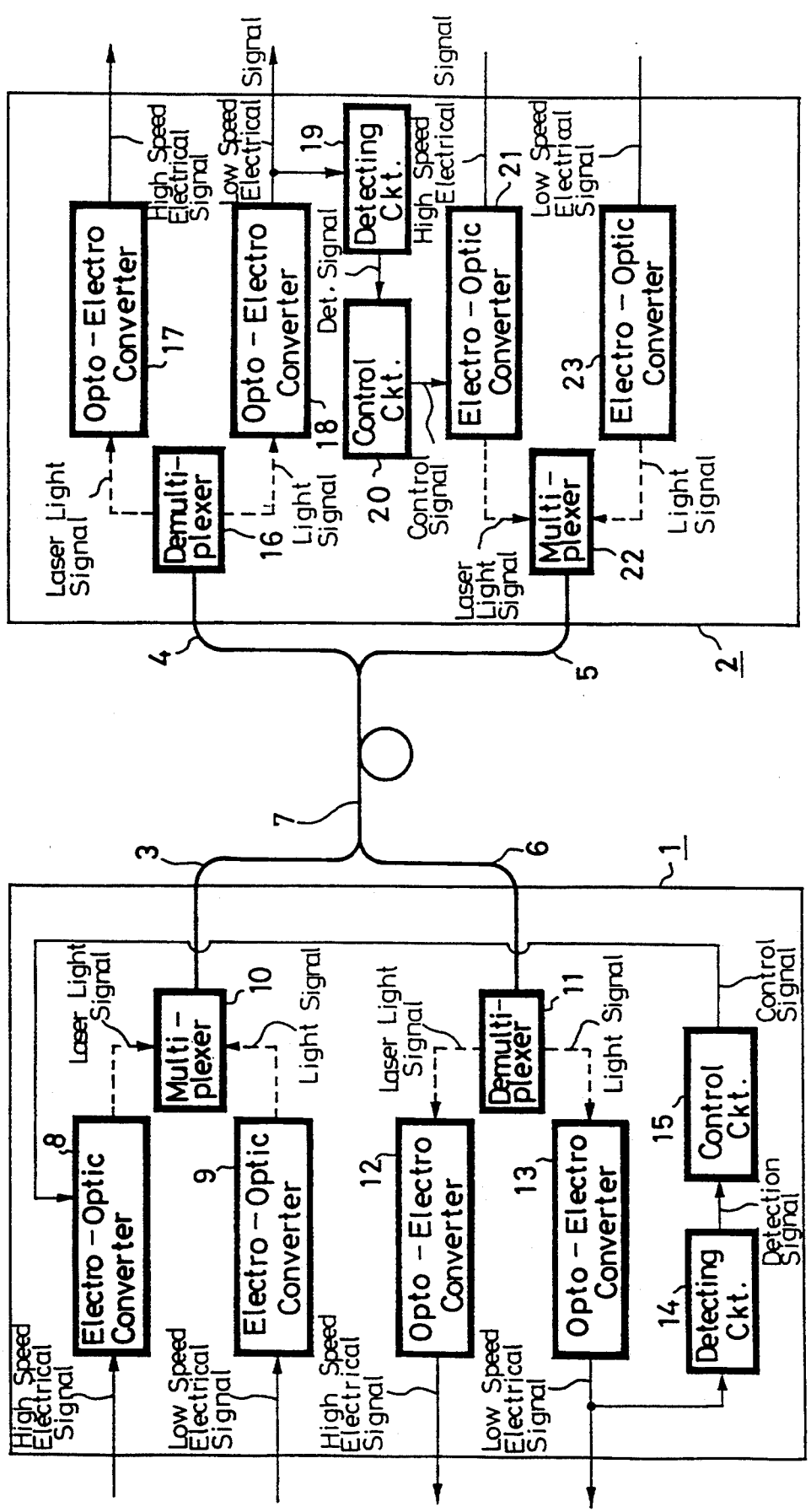
FIG. 2 is a block diagram showing a light signal transmitting apparatus according to an embodiment of the present invention.

As shown in FIG. 2, links 1, 2 serving as first and second light signal terminals are coupled whereby optical fiber 3 is coupled to optical fiber 4 via two-core optical fiber 7 for transmission of light signals in one direction, and optical fiber 5 is coupled to optical fiber 6 via two-core optical fiber 7 for transmission of light signals in an opposite direction.

The link 1 includes a laser diode 8 serving as an electro-optic converting means {laser light (coherent light) emitting device}, an LED (light emitting diode) 9 serving as an electro-optic converting means {non-laser light (non-coherent light) light emitting device}, a multiplexer 10 serving as a wavelength division multiplexing means for multiplexing the laser light signal and the light signal from the laser diode 8 and the LED 9, a demultiplexer 11 serving as a separating means for separating a multiplexed light signal, photo-diodes 12, 13 serving as opto-electro converting means for receiving the laser light signal and the light signal from the demultiplexer 11 and converting the same into an electrical signal, a detecting circuit 14 supplied with the electrical signal from the photo-diode 13 and generating a detection signal when the photo-diode 13 generates an electrical signal of level higher than a predetermined level, and a control circuit 15 for controlling the laser diode 8 on the basis of the detection signal from the detecting circuit 14 such that the laser diode 8 generates a laser light signal of sufficiently high output when the detecting circuit 14 generates a detection signal and that the laser diode 8 generates a laser light signal of low output or disabled when the detecting circuit 14 generates no detection signal.

The link 2 includes a laser diode 21 serving as an electro-optic converting means {laser light (coherent light) emitting device}, an LED 23 serving as an electro-optic converting means {non-laser light (non-coherent light) emitting device}, a multiplexer 22 serving as wavelength division multiplexing means for multiplexing the laser light signal and the light signal from the laser diode 21 and the LED 23, a demultiplexer 16 serving as a separating means for separating the multiplexed light signal, photo-diodes 17, 18 serving as opto-electro converting means for receiving the laser light signal and the light signal from the demultiplexer 16 and converting the same into electrical signals, a detecting circuit 19 supplied with the electrical signal from the photo-diode 18 and generating a detection signal when the photo-diode generates an electrical signal of level higher than a predetermined level, and a control circuit 20 for controlling the laser diode 21 on the basis of the detection signal from the detecting circuit 19 such that the laser diode 21 generates a laser light signal of sufficiently high output when the detecting circuit 19 generates the detection signal and that the laser diode 21 generates a laser light signal of low output or disabled when the detecting circuit 19 generates no detection signal.

The high speed electrical signal (video signal, audio signal, video/audio signal, data signal, etc.) and the low speed electrical signal (control signal, etc.) from the link 2 are respectively supplied to the laser diode 21 and the LED 23, in which they are converted into a laser light signal (laser light signal modulated by the high speed electrical signal) and a light signal (light signal modulated by the low speed electrical signal), respectively. The laser light signal and the light signal from the laser diode 21 and the LED 23 are multiplexed in wavelength by the multiplexer 22. A multiplexed signal from the multiplexer 22 is transmitted through the optical fibers 5, 7, 6, and separated by the demultiplexer 11 of the link 1. Then, the laser light signal and the light signal are received by the photo-diodes 12, 13, in which they are reconverted into the original high speed electrical signal and the low speed electrical signal, respectively.

The high speed electrical signal (video signal, audio signal, video/audio signal, data signal, etc.) and the low speed electrical signal (control signal, etc.) from the link 1 are respectively supplied to the laser diode 8 and the LED 9, in which they are converted into a laser light signal (laser light signal modulated by the high speed electrical signal) and a light signal (light signal modulated by the low speed electrical signal), respectively. The low speed electrical signal, which is the received output of the photo-diode 13, is supplied to the detecting circuit 14 and the control circuit 15 controls the light emission of the laser diode 8 on the basis of the detection signal from the detecting circuit 14. Under the control of the control circuit 15, when it is detected by the detecting circuit 14 that the low speed electrical signal from the photo-diode 13 is held at level higher than a predetermined level, the laser diode 8 emits a laser light signal of sufficiently high output. When the detecting circuit 14 generates no detection signal, the laser diode 8 is disabled to generate a laser light signal or generates a laser light signal of low output sufficient that the laser light signal can be prevented from damaging human eyes or the like even if leaked to the outside from the optical fiber. The laser light signal from the laser diode 8 and the light signal, which is constantly generated from the LED 9 regardless of the existence of the detection signal from the detecting circuit 14, are multiplexd in wavelength by the multiplexer 10. Then, the multiplexed signal from the multiplexer 10 is transmitted to the link 2 through the optical fibers 3, 7 and 4.

The multiplexed signal is separated by the demultiplexer 16 in the link 2. The laser light signal and the light signal thus separated are received by the photo-diodes 17, 18, in which they are converted into the high speed electrical signal and the low speed electrical signal, respectively. The low speed electrical signal from the photo-diode 18 is supplied to the detecting circuit 19, and the control circuit 20 controls the light emission of the laser diode 21 on the basis of the detection signal. When it is determined by the detecting circuit 19 that the low speed electrical signal from the photo-diode 18 is held at level higher than a predetermined level, the laser diode 21 generates a laser light signal of sufficiently high output. When the detecting circuit 19 generates no detection signal, the laser diode 21 is disabled to generate a laser light signal or generates a laser light signal of low output sufficient so that the laser light signal can be prevented from damaging human eyes or the like even if leaked to the outside from the optical fiber. Then, the laser light signal of sufficiently high output from the laser diode 21 and the light signal, which is constantly generated from the LED 23 regardless of the existence of the detection signal from the detecting circuit 19, are multiplexed in wavelength by the multiplexer 22, and the multiplexed signal from the multiplexer 22 is transmitted to the link 1 through the optical fibers 5, 7 and 6.

Operation of the link 1 will be described below with reference to a flowchart forming FIG. 3.

Figure 3:
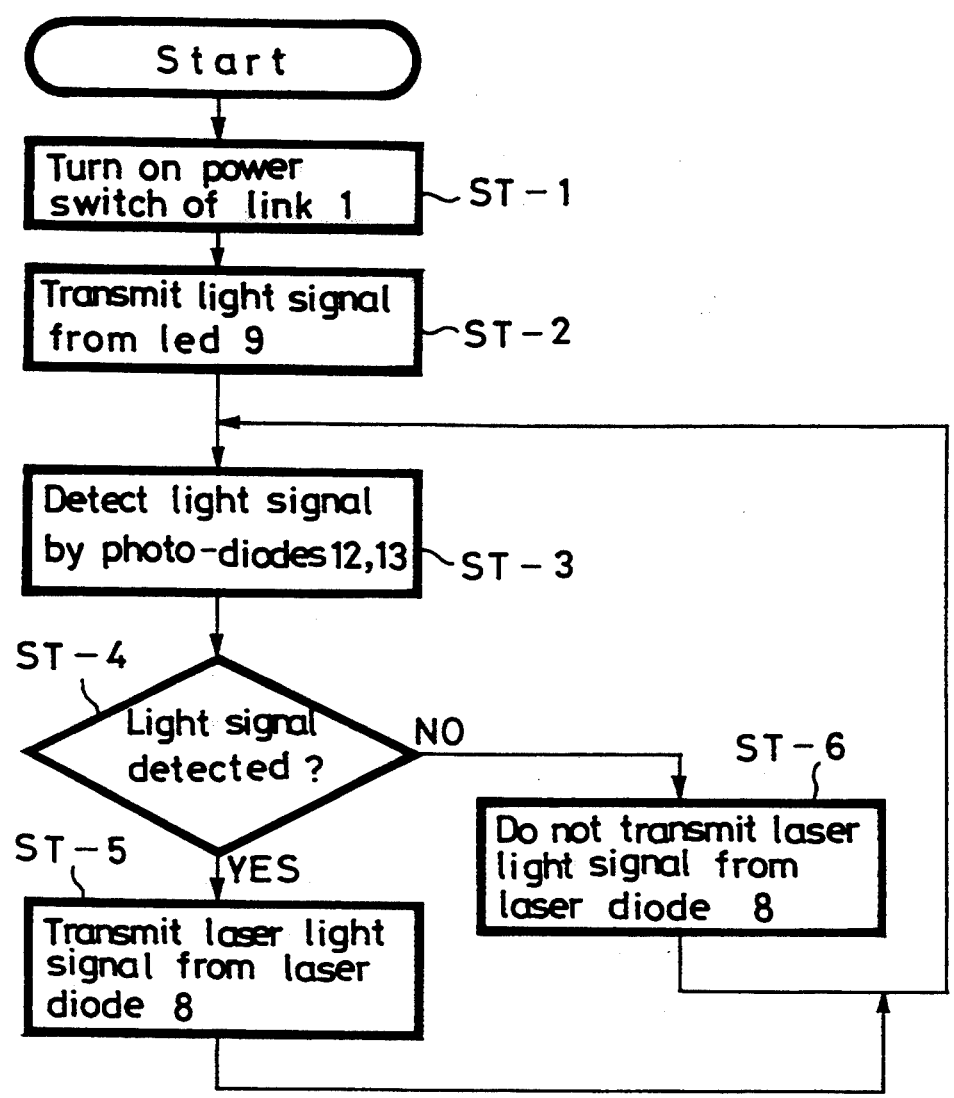
FIG. 3 is a flowchart to which reference will be made in explaining operation of the light signal transmitting apparatus according to the embodiment of the present invention.

As shown in FIG. 3, following the start of operation, the link 1 is powered at step ST-1, and then the processing proceeds to the next step ST-2. In step ST-2, the light signal is transmitted from the led 9 and the processing proceeds to step ST-3. At step ST-3, the light signal is detected by the photo-diodes 12, 13 and the processing proceeds to the next decision step ST-4. It is determined at decision step ST-4 whether or not a light signal of level higher than a predetermined level is detected by the detecting circuit 14. If a YES is output at decision step ST-4, then the processing proceeds to step ST-5. If on the other hand a NO is output at decision step ST-4, then the processing proceeds to step ST-6. At step ST-5, the laser light signal from the laser diode 8 is transmitted and then the processing returns to step ST-3. At step ST-6, the laser light signal is not transmitted from the laser diode 8 (or the laser diode 8 generates a laser light whose output level is too low to damage human eyes or the like) and then the processing returns to step ST-3. Operation of the link 2 is the same as that of the link 1 and therefore need not be described with reference to the flowchart of FIG. 3.

According to the light signal transmitting apparatus according to the embodiment of the present invention, the laser light signal of sufficiently high output level can be transmitted in both of the links 1 and 2. Therefore, there is then no risk that the transmission quality is deteriorated and that the transmission distance is reduced. Further, even when the optical fiber is disengaged from optical equipments or broken down, the light signal transmitted between the links 1 and 2 can be prevented from being leaked to the outside to damage human eyes or the like. In particular, when the light signal transmitted through the optical fiber is the high speed electrical signal, the transmission of a light signal of a broadband electrical signal becomes possible. If the laser light signal is leaked to the outside from the optical fiber, such leaked laser light signal may damage human eyes or the like badly. However, according to the light signal transmitting apparatus of the present invention, such risk that the leaked laser light signal may hurt human eyes or the like can be avoided effectively. Further, since the light signal for controlling the laser diode to generate the laser light signal is the non-laser light signal from the LED or the like, there is then a small risk that the non-laser light may hurt human eyes or the like even if such non-laser light is leaked to the outside from the optical fiber. In particular, it is sufficient that such non-laser light is low in output level. Therefore, in that case, the non-laser light can be prevented from hurting human eyes or the like perfectly.

The present invention is not limited to the transmission of the laser light signal and may also be applied to the transmission of a non-laser light signal of high output level.

According to the present invention, in the light signal transmitting apparatus which includes the pair of light signal terminals and the two optical fibers for coupling the two terminals to transmit the light signals in the opposite directions, the light signal of sufficiently high output level can be transmitted (accordingly, there is then no risk that the transmission quality is degraded and that the transmission distance is reduced). Also, even when the optical fiber is disengaged from the optical equipment or broken down, there is then no risk that the light signal transmitted through the optical fiber is leaked to the outside to hurt human eyes or the like.

According to the present invention, at least in the first light signal terminal, the light signal of sufficiently high output level can be transmitted (accordingly, there is then no risk that the transmission quality is degraded and that the transmission distance is reduced). Also, even when the optical fiber is disengaged from the optical equipment or broken down, there is then no risk that the light signal, which is transmitted from the first light signal terminal to the second light signal terminal through the optical fibers, is leaked to the outside to hurt human eyes or the like.

Furthermore, according to the present invention, in both of the first and second light signal terminals, the light signal of sufficiently high output level can be transmitted (accordingly, there is then no risk that the transmission quality is degraded and that the transmission distance is reduced). Also, even when the optical fiber is disengaged from the optical equipment or broken down, there is then no risk that the light signal, which is transmitted between the first and second light signal terminals in a two-way fashion through optical fibers, is leaked to the outside to hurt human eyes or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A light signal transmitting apparatus having first and second light signal terminals and two optical fibers for coupling said first and second light signal terminals to transmit light signals in the opposite directions, comprising:

said first light signal terminal comprising:

separating means for separating a multiplexed light signal in which first and second light signals are multiplexed;

first and second light-sensing means for receiving said first and second light signals thus separated;

detecting means for generating a detection signal on the basis of a received output of said second light-sensing means; and first light emitting means controlled by said detecting means so that said first light emitting means emits a third light signal of sufficiently high output level when said second light signal is detected by said detecting means and that said first light emitting means emits a third light signal of low output level or disabled when said second light signal is not detected by said detecting means; and said second light signal terminal comprising:

third light-sensing means for receiving said third light signal;

second and third light emitting means for emitting said first and second light signals; and multiplexing means for multiplexing said first and second light signals to provide said multiplexed signal.

2. A light signal transmitting apparatus according to claim 1, wherein said first and second light emitting means are laser light light emitting devices and said third light emitting means is a non-laser light light emitting device.

3. A light signal transmitting apparatus according to claim 1, wherein said first and second light emitting means are laser diodes and said third light emitting means is an LED.

4. A light signal transmitting apparatus having first and second light signal terminals and two optical fibers for coupling said first and second light signal terminals to transmit light signals in the opposite directions, comprising:

said first light signal terminal comprising:

first separating means for separating a first multiplexed signal in which first and second light signals are multiplexed to provide first and second light signals;

first and second light-sensing means for receiving said first and second light signals thus separated;

first detecting means for generating a first detection signal on the basis of a received output of said second light-sensing means;

first light emitting means controlled by said first detecting means so that said first light emitting means emits a third light signal of sufficiently high output level when said second light signal is detected by said first detecting means and that said first light emitting means emits a third light signal of low output level or disabled when said second light signal is not detected by said first detecting means;

second light emitting means for emitting a fourth light signal regardless of whether or not said second light signal is detected by said first detecting means; and first multiplexing means for multiplexing said third and fourth light signals form said first and second light emitting means; and said second light signal terminal comprising:

second separating means for separating said second multiplexed light signal to provide said third and fourth light signals;

third and fourth light-sensing means for receiving said third and fourth light signals thus separated;

second detecting means for generating a second detection signal on the basis of a received output of said fourth light-sensing means;

third light emitting means controlled by said second detecting means so that said third light emitting means emits said first light signal of sufficiently high output level when said fourth light signal is detected by said second detecting means and that said third light emitting means emits said first light signal of low output level or disabled when said fourth light signal is not detected by said second detecting means;

fourth light emitting means for emitting said second light signal regardless of whether or not said fourth light signal is detected by said second detecting means; and second multiplexing means for multiplexing said first and second light signals from said third and fourth light emitting means to provide said first multiplexed signal.

5. A light signal transmitting apparatus according to claim 4, wherein said first and third light emitting means are laser light light emitting devices and said second and fourth light emitting means are non-laser light light emitting devices.

6. A light signal transmitting apparatus according to claim 4, wherein said first and third light emitting means are laser diodes and said second and fourth light emitting means are LEDs.

7. A light signal terminal for transmitting and receiving a light signal, comprising:

first light emitting means for emitting a first light signal;

second light emitting means for emitting a second light signal;

multiplexing means for multiplexing said first and second light signals to generate a transmission multiplexed signal;

separating means for separating a received multiplexed signal to generate third and fourth light signals;

first light-sensing means for receiving said third light signal;

second light-sensing means for receiving said fourth light signal; and control means for controlling the output level of said first light signal on the basis of a received output of said second light-sensing means.

8. A light signal terminal according to claim 7, wherein said first light emitting means is a laser light light emitting device and said second light emitting means is a non-laser light light emitting device.

9. A light signal terminal according to claim 7, wherein said first light emitting means is a laser diode and said second light emitting means is an LED.

* * * * *